United States Patent
Kabasawa (10) Patent No.: US 7,701,814 B2
(45) Date of Patent: Apr. 20, 2010

(54) OPTICAL PICKUP DEVICE AND OPTICAL DISK DEVICE

(75) Inventor: Hidetoshi Kabasawa, Ogawamachi (JP)

(73) Assignee: TEAC Corporation, Tami-shi (JP)

( * ) Notice: Subject to any disclaimer, the term of this patent is extended or adjusted under 35 U.S.C. 154(b) by 453 days.

(21) Appl. No.: 11/571,870

(22) PCT Filed: May 11, 2005

(86) PCT No.: PCT/JP2005/008591

§ 371 (c)(1),
(2), (4) Date: Jan. 9, 2007

(87) PCT Pub. No.: WO2006/006296

PCT Pub. Date: Jan. 19, 2006

(65) Prior Publication Data

US 2007/0201327 A1    Aug. 30, 2007

(30) Foreign Application Priority Data

Jul. 12, 2004   (JP)   ............................. 2004-204778

(51) Int. Cl.
*G11B 7/00* (2006.01)

(52) U.S. Cl. .............. 369/44.32; 369/44.14; 369/53.19; 369/112.01

(58) Field of Classification Search ........................ None
See application file for complete search history.

(56) References Cited

U.S. PATENT DOCUMENTS 4,638,471 A    1/1987    van Rosmalen 5,430,699 A *  7/1995    Matsubara et al. ....... 369/44.32
5,699,340 A * 12/1997    Lee et al. ................. 369/53.19
7,088,659 B2 * 8/2006    Hibino ..................... 369/53.19
2004/0057353 A1 3/2004   Ohno

FOREIGN PATENT DOCUMENTS

| JP | 62-3438 A1 | 1/1987 |
| JP | 63-52336 A1 | 3/1988 |
| JP | 2-10529 A1 | 1/1990 |
| JP | 5-62232 A1 | 3/1993 |
| JP | 6-111350 A2 | 4/1994 |
| JP | 9-212901 A1 | 8/1997 |
| JP | 2000-57585 A | 2/2000 |
| JP | 2004-164810 A | 6/2004 |

\* cited by examiner

*Primary Examiner*—Muhammad N. Edun
(74) *Attorney, Agent, or Firm*—Christensen O'Connor Johnson Kindness PLLC (57) ABSTRACT

An optical pickup device for recording and reproducing information by tilting and horizontally driving a lens holder, holding an objective lens, to irradiate an optical disk with a recording/reproducing laser light from a light source. The optical pickup device has a reflector for reflecting a portion of the recording/reproducing laser light led to the lens holder from the light source; a detector fixedly placed at a position at which the amount of received light for detection, which is the recording/reproducing laser light reflected by the reflector, varies according to the tilt angle of the lens holder; and tilt angle acquisition means for acquiring the tilt angle of the objective lens from the light receiving amount detected by the detector.

8 Claims, 10 Drawing Sheets

OPTICAL PICKUP DEVICE AND OPTICAL DISK DEVICE

TECHNICAL FIELD

The present invention relates to an optical pickup device which irradiates an optical disk with a recording/reproduction laser beam from a light source to thus record or reproduce information, by means of tilting and horizontally driving a lens holder which holds an objective lens.

BACKGROUND ART

An optical pickup device irradiates a recording plane of an optical disk with a recording/reproduction laser beam, to thus record or reproduce information. At this time, in order to effect recording and reproduction with high accuracy, there is a necessity for holding an objective lens for gathering the recording/reproduction laser beam on an optical disk in parallel with the optical disk. To this end, an objective lens is mounted with high accuracy in a production stage. For instance, Japanese Patent Publication Laid-Open No. 2000-57585 describes an objective lens tilt-monitoring device capable of adjusting the tilt of mount of the objective lens with high accuracy. This device irradiates the periphery of the objective lens with light, and detects the inclination of the objective lens in accordance with the intensity of light reflected from the periphery and a position where reflected light has returned. This device enables high-precision mounting of the objective lens.

However, even when the objective lens is mounted with high accuracy, there may arise a case where an objective lens does not lie parallel to an optical disk, because of warpage in an optical disk. Accordingly, a recorded area of the optical disk is subjected to test exposure while the tilt angle of the objective lens is being changed. The tilt angle of the objective lens achieved when reproduction quality of reference value or more is achieved and stored as reference tilt angle. There is adopted tilt correction for correcting the tilt angle of an objective lens by reference to the stored reference tilt angle. Even when warpage has arisen in an optical disk, the objective lens and the optical disk can be held in parallel with each other, thereby enhancing reliability of recording and reproduction of information.

However, the reference tilt angle has hitherto been stored as a voltage applied to a drive device which tilts and drives an objective lens. The drive device comprises two electromagnetic coils which impart vertical thrust to respective right and left objective lenses. When the objective lens shifts in a radial direction as a result of the optical pickup device having performed seeking operation in the radial direction of a disk, a displacement arises between the center of the thrust originating from an electromagnetic coil and the centroid of a lens holder assembly, and the tilt angle varies even for a constant voltage. In short, no correspondence exists between an applied voltage and a tilt angle. Accordingly, even when a storage voltage has been applied, there is a problem of the objective lens failing to assume a reference tilt angle and a drop arising in recording/reproduction accuracy.

Therefore, the present invention aims at providing an optical pickup device which enables a further improvement in recording/reproduction accuracy.

DISCLOSURE OF INVENTION

An optical pickup device of the present invention is an optical pickup device which irradiates an optical disk with a recording/reproduction laser beam from a light source while tilting and horizontally actuating a lens holder which holds an objective lens, to thus record/reproduce information, the device comprising:

a reflector which is provided in the lens holder and reflects a portion of the recording/reproduction laser beam guided from the light source to the lens holder;

light detection means fixedly placed at a position where the amount of received reflected light for sensing, which is the recording/reproduction laser beam reflected by the reflector, changes in accordance with a tilt angle of the lens holder; and tilt angle acquisition means for acquiring a tilt angle of the objective lens based on the amount of received light detected by the light detection means.

In a preferred mode, the tilt angle acquisition means eliminates, from the amount of received light detected by the light detection means, changes in the amount of light received by the light detector attributable to horizontal actuation of the lens holder, to thus acquire a tilt angle. Preferably, the recording/reproduction laser beam assumes a known, uneven distribution of light intensity; and the tilt angle acquisition means acquires, based on changes in light intensity of the total reflected light for sensing stemming from horizontal actuation, changes in the amount of light received by the light detector attributable to horizontal actuation of the lens holder.

In another preferred mode, the recording/reproduction laser beam is set to a beam size which is greater than an aperture of the objective lens; and the reflector is placed at a position where the reflector reflects a recording/reproduction laser beam which does not enter the objective lens is reflected. Desirably, the lens holder has an aperture limitation section for limiting a beam size of the recording/reproduction laser beam entering the objective lens; and the reflector is provided in the aperture limitation section.

In still another preferred mode, an optical path of signal light, which is the recording/reproduction laser beam reflected by the optical disk, and an optical path of the reflected light for sensing are oriented in a single direction; and the reflector is disposed at a tilt with respect to incident light to thus lightly separate the reflected light for sensing from the signal light and guide the reflected light to the light detector.

In yet another preferred mode, the optical pickup device further comprises signal light polarization means for polarizing signal light to a polarization angle differing from that of incident light; reflected light polarization means for polarizing the reflected light for sensing to the same angle as that of the signal light; and a polarization beam splitter for separating the direction of the optical path of incident light from the direction of the optical path of the signal light and the direction of the optical path of the reflected light for sensing, in accordance with an angle of polarization. In another preferred mode, when a reflection plane of the reflector tilts with respect to a plane where the reflector is formed, the reflection plane of the reflector is formed stepwise in numbers.

Another optical disk device of the present invention is an optical disk device which irradiates an optical disk with a recording/reproduction laser beam by means of an optical pickup device to thus record/reproduce information, the optical disk device comprising: any of the optical pickup devices; storage means for storing, as a reference tilt angle, a tilt angle of a lens holder acquired when reproduction quality satisfies a predetermined standard during test exposure to an optical disk; and control means for effecting actuation and control, in accordance with a deviation between a reference tilt angle stored in the storage means and a tilt angle of the current lens holder, in such a way that the lens holder assumes the reference tilt angle, wherein the reference tilt angle and the tilt angle of the current lens holder are acquired by the tilt angle acquisition means of the optical pickup device. Here, the term "predetermined standard" includes a standard of a jitter value or a parameter value showing reproduction quality, such as an error rate, being a "predetermined standard value or more"; or a "best" standard.

According to the present invention, an accurate tilt angle of an objective lens can be acquired, and hence recording/reproduction quality of information can be enhanced to a greater extent.

BEST MODE FOR CARRYING OUT THE INVENTION

Figure 1:
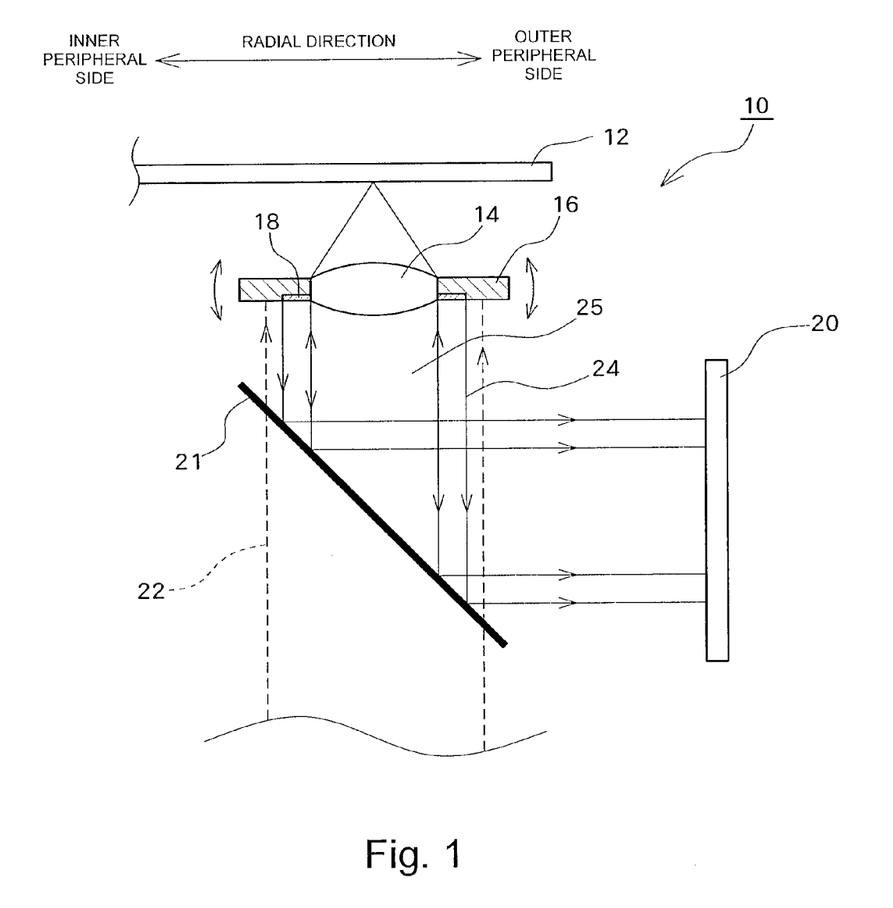
FIG. 1 is a general diagram of an optical pickup device which is an embodiment of the present invention.

Embodiments of the present invention will be described hereunder by reference to the drawings. First, the basic principle of the present invention will be described. FIG. 1 is a general diagram of an optical pickup device 10.

As is well known, the optical pickup device 10 gathers, by means of an objective lens 14, a recording/reproduction laser beam emitted from an unillustrated light source, and irradiates a recording plane of an optical disk 12 with the thus-gathered laser beam, thereby recording or reproducing information. The recording/reproduction laser beam reflected by the recording plane of the optical disk 12 returns as signal light 25 including information; travels along an optical path differing from an incident optical path in an optical system such as a beam splitter 21; and is received by a photodetector provided in a light-receiving section 20. Examples of the optical disk 12 include a CD±R/RW, a DVD±R/RW, an HD-DVD, a BLU-RAY, and the like.

The objective lens 14 is disposed opposite the optical disk 12 and is held by a lens holder 16. By means of an unillustrated drive source, this lens holder 16 can be actuated horizontally or vertically, and can be tilted.

In order to acquire high recording/reproducing quality, an optical axis of the laser beam radiated onto the optical disk 12 must be perpendicular to the optical disk 12. Put another way, the objective lens 14 must be parallel with the optical disk 12. Particularly, in the case of a high-density optical disk such as a DVD, an HD-DVD, a BLU-RAY, and the like, the recording/reproduction laser beam is light of shorter wavelength. A nominal inclination of the optical axis greatly affects the magnitude of coma aberration.

For this reason, individual components of the optical pickup device 10, including the objective lens 14, are assembled with high accuracy at a production stage. However, even when the parts have been assembled with high accuracy, there may also arise a case where parallelism with the objective lens 14 is not maintained, for reasons of warpage in the optical disk 12. The amount of warpage varies from one optical disk 12 to another, and cannot be uniformly addressed. Accordingly, in order to address warpage arising in an individual optical disk, there has hitherto been adopted tilt correction for tilting the objective lens 14 in a radial direction to thus maintain parallelism with the optical disk 12.

Tilt correction is for correcting the tilt of the objective lens 14, as appropriate, in such a way that a previously-stored reference tilt angle is achieved. This reference tilt angle is determined by means of initially irradiating a recorded area of the optical disk 12 with the recording/reproduction laser beam while the tilt angle of the objective lens is being changed to thus effect test reproduction. The tilt angle at which a result of test reproduction has showed best reproduction quality or reproduction quality of a predetermined reference value or more is taken as the reference tilt angle. In the case of an HD-DVD, reproduction of a groove SCM may also be acceptable in lieu of reproduction of data from the recorded area. In this case, best reproduction quality means that a reproduced output level of an inner peripheral groove SCM becomes equal to a reproduced output level of an outer peripheral groove SCM. Reproduction quality of a predetermined reference value or more signifies that a difference between two reproduced output levels falls within an allowance.

Here, in order to enhance recording/reproduction quality by means of tilt correction, the stored reference tilt angle must coincide with an actual tilt angle detected during recording/reproduction of information. To this end, detection of an accurate tilt angle is naturally required. Therefore, in the present embodiment, a reflector, a detector for sensing purpose, or the like, which will be described hereinbelow, is provided, thereby detecting the tilt angle of the objective lens. This will be described hereunder.

In the present embodiment, the lens holder 16 is equipped with a reflector 18 formed from a mirror or the like for the purpose of detecting a tilt angle. No particular limitations are imposed on the position and size of the reflector 18, so long as the reflector can reflect a portion of an incident laser beam 22 that enters the lens holder 16 and acts as a recording/reproduction laser beam. However, in order to prevent occurrence of an obstruction to recording/reproduction of information, the reflector is desirably provided at a position where the reflector reflects the incident laser beam 22 that is not utilized for recording/reproducing information. Specifically, rendering a beam size of the incident laser beam 22 greater than an entrance aperture for the objective lens 14 is desirable, and the reflector is desirably provided at a location where it can reflect the light of the outer periphery of the incident laser beam 22. Moreover, a single reflector 18 may be provided, or a plurality of the same may be provided. However, placing a plurality of reflectors in a separated manner is desirable.

The recording/reproduction laser beam reflected by the reflector 18 acts as reflected light for sensing 24 for use in detecting a tilt angle. After an optical path of the reflected light for sensing 24 has been appropriately controlled by an optical system, such as a polarization beam splitter 21 or the like, a detector provided in the light-receiving section 20 receives the reflected light for sensing.

Now, the optical path of the reflected light for sensing 24 is preferably made essentially identical with an optical path of signal light 25 reflected by the optical disk 12. By means of making the optical path of the reflected light for sensing identical with that of the signal light, a detector for use in reading information and a detector for sensing purpose can be placed in close proximity to each other, thereby enabling simplification of the configuration of the overall optical pickup device 10 and miniaturizing the optical pickup device, as well. In consideration of prevention of crosstalk, which would otherwise be caused as a result of mixing of the signal light 25 with the reflected light for sensing 24, the optical path of the reflected light for sensing 24 is preferably located at a position which is slightly outward in the radial direction with reference to the optical path of the signal light 25. This can be realized by means of inclining a reflection plane of the reflector 18 toward the outside in the radial direction. Alternatively, in some cases, the optical path of the signal light 25 may completely differ from the optical path of the reflected light for sensing 24.

The detector is a photodetector for receiving the reflected light for sensing 24. The detector is provided at a position where the amount of light received by the reflected light for sensing 24 changes with the inclination of the lens holder 16. Moreover, when the reflector 18 is provided in numbers; namely, when the reflected light for sensing 24 is present as a plurality of beams, a separate detector is preferably provided for each of the beams of reflected light for sensing 24. Alternatively, the detector corresponding to each of the reflectors 18 may also be a single photodetector. However, a photodetector split into a plurality of segments is desirable.

Figure 2A:
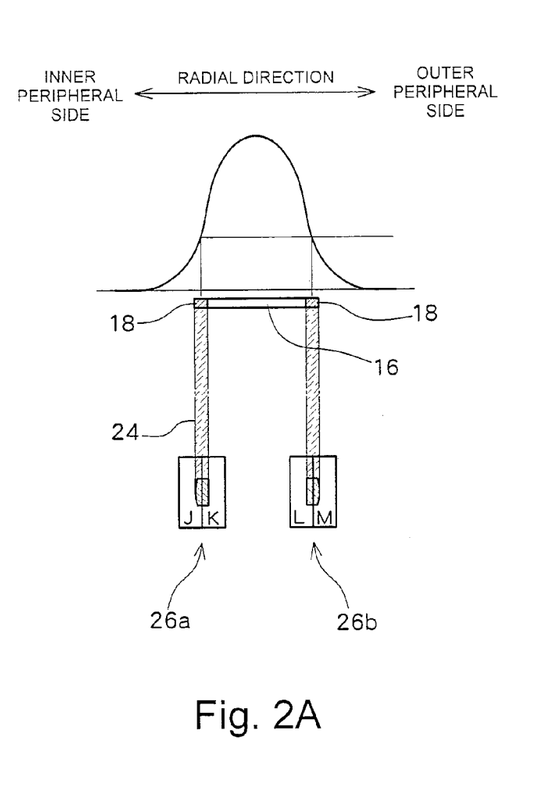
FIG. 2A is a view illustrating the basic principle of the present invention, or a view showing light intensity detected by a detector when a lens holder is not inclined.
Figure 2B:
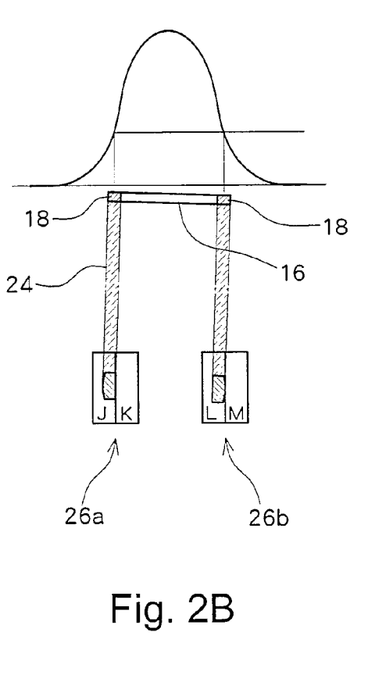
FIG. 2B is a view illustrating the basic principle of the present invention, or a view showing light intensity detected by the detector when the lens holder is inclined.
Figure 2C:
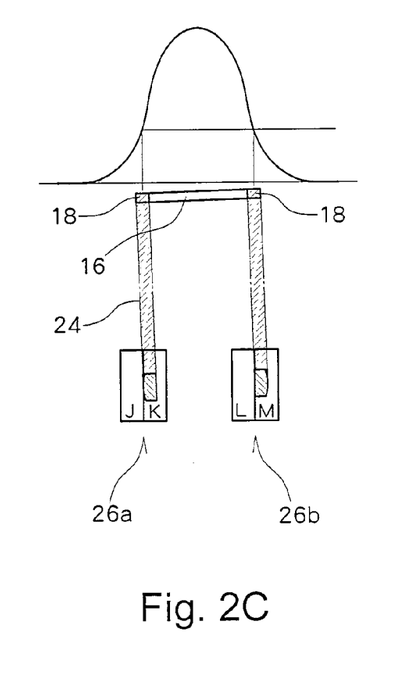
FIG. 2C is a view illustrating the basic principle of the present invention, or a view showing light intensity detected by the detector when the lens holder has been inclined.

After the light has been converted into an electrical signal, the light intensity detected by the detector is output to an unillustrated computing section. The computing section acts as tilt angle acquisition means, and computes and outputs the tilt angle of the objective lens from a change in the detected light intensity. A principle in computation of the tilt angle will be described by reference to FIGS. 2A to 2C. FIGS. 2A to 2C are views showing a relationship between the inclination of the lens holder 16 and the light intensity detected by a detector 26. In the drawings, the distribution of light intensity of the incident laser beam 22 is shown in an upper portion of the drawing; the manner of inclination of the lens holder 16 is shown in a middle portion of the drawing; and detection, light-receiving positions of the detector 26 are provided in a lower portion of the drawing. There is illustrated a case where the detector 26 is provided for each of the reflectors 18 and where a two-way-split photodetector is used as each of the detectors 26. Of the two-way-split photodetectors, photodetector pieces (J and L in FIGS. 2A to 2C) located on the inner periphery side are hereinafter called "inner-peripheral detectors," and photodetector pieces (K, M) located on the outer periphery side are hereinafter called "outer-peripheral detectors."

When the lens holder 16 is in a level position (FIG. 2A), an incident laser beam having entered the reflector 18 is reflected at right angles and received by the detector 26. Meanwhile, when the lens holder 16 is inclined toward the outer periphery (FIG. 2B), the optical axis of the reflected light for sensing 24 is inclined, and the reflected light is detected by the detector 26 at a position offset toward the inner periphery. In other words, when compared with the case where the lens holder is in a level position, the amount of light received by the inner peripheral detectors J and L becomes greater, whereas the amount of light received by the outer peripheral detectors K and M becomes smaller. Meanwhile, the lens holder 16 is inclined toward the inner periphery (FIG. 2C), the reflected light for sensing 24 is received at a position deviated from the outer periphery. Put another way, when compared with the case where the lens holder is in a level position, the amount of light received by the inner peripheral detectors J and L becomes smaller, whereas the amount of light received by the outer peripheral detectors K and M becomes greater.

Specifically, the tilt angle of the lens holder 16 is reflected in changes in the amounts of light received by respective photodetectors. At this time, when no changes exist in the level position of the lens holder 16, no changes arise in the light intensity of the recording/reproduction laser beam radiated onto the reflectors 18. Accordingly, changes in the light intensity detected by the respective photodetectors can be handled, without modification, as changes in the amounts of received light.

Figures 3A, 3B:
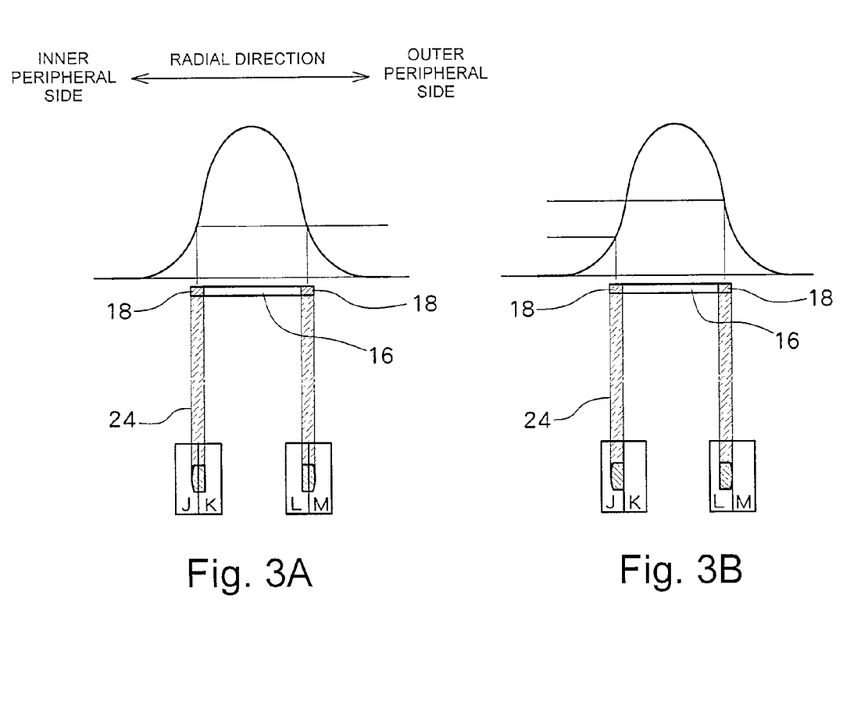
FIG. 3A is a view illustrating the basic principle of the present invention, or a view showing light intensity detected by the detector when the lens holder is not horizontally actuated.
FIG. 3B is a view illustrating the basic principle of the present invention, or a view showing light intensity detected by the detector when the lens holder has been horizontally actuated.
Figure 3C:
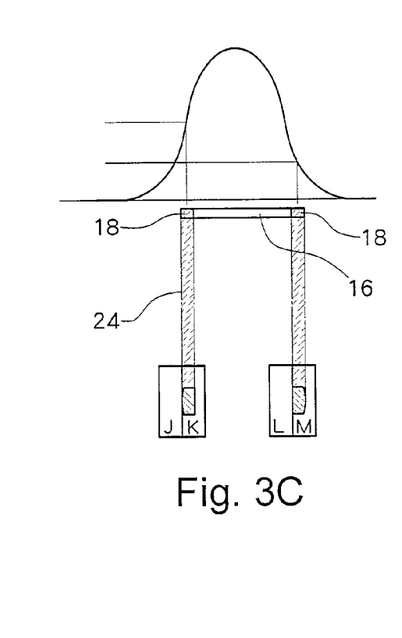
FIG. 3C is a view illustrating the basic principle of the present invention, or a view showing light intensity detected by the detector when the lens holder has been horizontally actuated.

The computing section computes a tilt angle in accordance with a relationship between a tilt angle and a change in the amount of received light, and outputs a result of computation. Incidentally, the amounts of light received by the respective photodetector pieces are changed not only by the inclination of the lens holder 16 but also by horizontal actuation of the lens holder 16 in a radial direction. For this reason, the computing section eliminates the change in the amount of received reflected light for sensing 24 attributable to the horizontal actuation of the lens holder 16 and computes a tilt angle. This will be described by reference to FIGS. 3A to 3C. FIGS. 3A to 3C are views showing a relationship between horizontal actuation of the lens holder 16 in a radial direction and the light intensity detected at that time by the detector 26.

As can be seen from FIGS. 3A to 3C, when the lens holder 16 is horizontally actuated, a change naturally arises in the position where the reflected light for sensing 24 returns, which in turn changes the amounts of light detected by the respective photodetector pieces. Consequently, when the lens holder 16 is horizontally actuated, the tilt angle of the lens holder 16 cannot be detected by means of only the changes in light intensity detected by the respective photodetector pieces.

The incident laser beam 22 usually assumes a non-uniform distribution of light intensity, in the manner of a Gaussian distribution. Consequently, when the lens holder 16 is horizontally actuated, a change also arises in the intensity of light radiated onto the reflectors 18, which in turn changes the light intensity of the entire reflected light for sensing 24. Specifically, changes in the amount of received reflected light for sensing 24 attributable to horizontal actuation can be acquired from changes in the light intensity of the overall reflected light for sensing 24. The light intensity of the entire reflected light for sensing corresponds to the total sum of the light intensity detected by the inner peripheral detectors J and L and the light intensity detected by the outer peripheral detectors K and M.

The operating section adds the light intensities detected by the respective photodetector pieces to a correction value determined from the light intensity of the entire reflected light for sensing 24, thereby enabling acquisition of a more accurate tilt angle. Various formulae are conceivable as an equation for computing a specific tilt angle. For instance, the following formula can be used.

$$\text{Angle} = \{(J-K)+(L-M)\} + k\{(J+K)-(L+M)\} \tag{1}$$

Reference symbols J, K, L, and M denote light intensity values detected by the respective photodetector pieces, and "k" denotes a correction coefficient. In a state where the lens holder 16 is not actuated in an inclined manner but is actuated in a level position (see FIGS. 3B and 3C), the correction coefficient "k" preferably assumes a value of Angle=0. So long as such a value is set as the correction coefficient "k," the lens holder can be determined to be inclined toward the outer periphery (a state shown in FIG. 2B) when a relationship of Angle>0 is achieved. In contrast, when a relationship of Angle<0 is achieved, the lens holder can be determined to be inclined toward the inner periphery (a state shown in FIG. 2C). As a matter of course, the tilt angle may also be determined by a formula other than Equation (1). Alternatively, means other than the light intensity of the entire reflected light for sensing may also detect the amount of horizontal actuation, and a correction value corresponding to the thus-detected amount of horizontal actuation may also be added to the changes in light intensity detected by the respective photodetector pieces.

Figure 4:
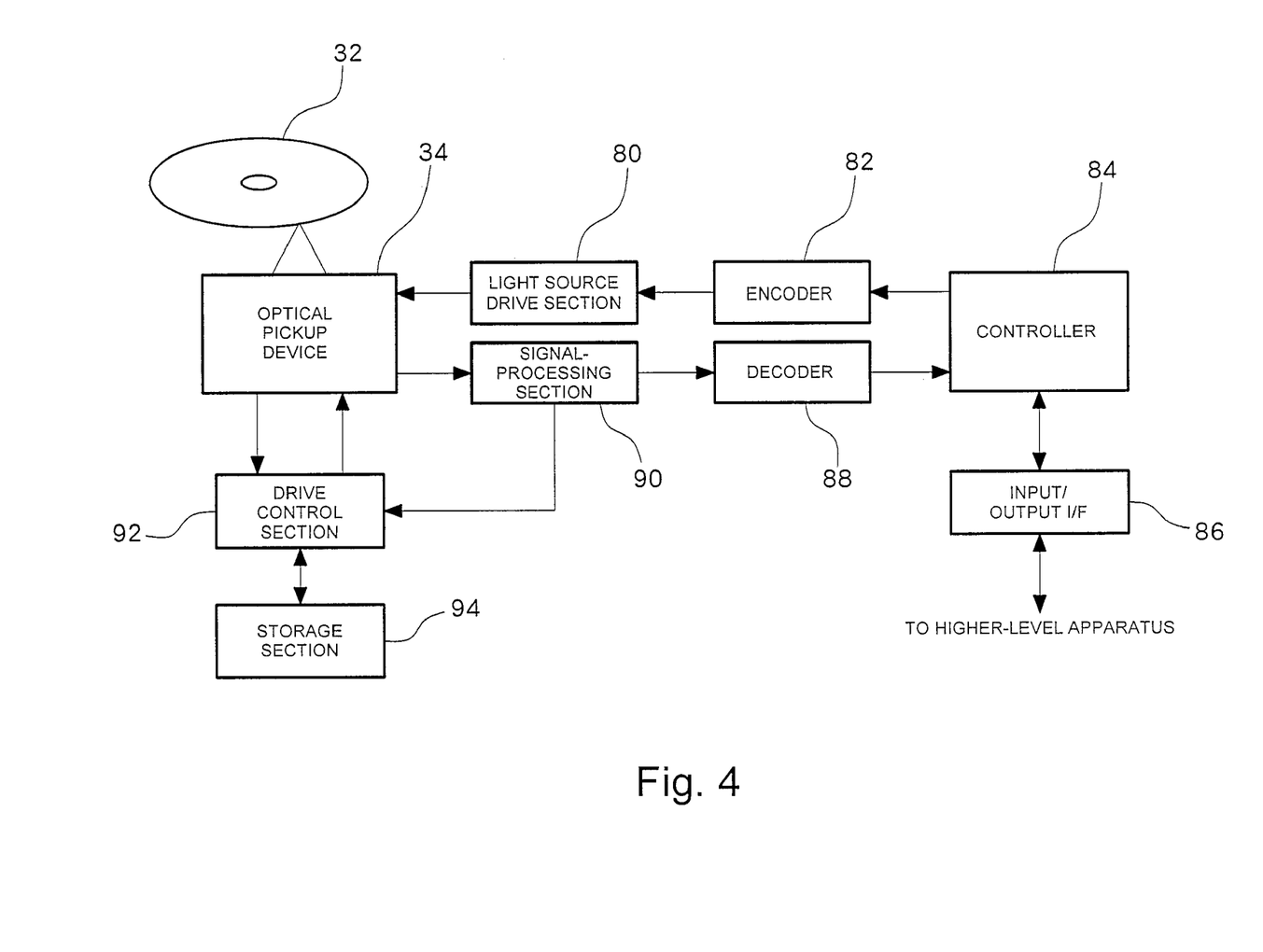
FIG. 4 is a block diagram of the optical disk device which is the embodiment of the present invention.

Next, an optical disk device 30 which is equipped with an optical pickup device utilizing the above principle and serves as an embodiment will be described. FIG. 4 is a block diagram of the entire configuration of the optical disk device 30.

An optical disk 32 is rotationally driven by an unillustrated spindle motor. An optical pickup 34 is disposed opposite the optical disk 32, and irradiates the surface of the optical disk 32 with a recording/reproduction laser beam to thus record or reproduce information. During recording of information, recording data are supplied from a controller 84 to an encoder 82. The encoder 82 encodes the supplied data, and outputs encoded data to a light source drive section 80. The light source drive section 80 generates a drive signal in response to the recording data, and drives the light source in the optical pickup device.

During reproduction of information, a reproduced signal acquired by a light-receiving section of the optical pickup device 34 is output to a signal-processing section 90, where the signal undergoes well-known RF signal processing, binarization processing, PLL synchronization processing, and the like. A tracking error signal, a focus error signal, an RF signal, and the like are generated. These signals are output to a drive control section 92. The RF signal is output to a decoder 88. After having been decoded, the RF signal is output as reproduced data to the controller 84. The controller 84 outputs the decoded data from the decoder 88 to a higher-level apparatus, such as a personal computer or the like, via an input/output interface 86.

The drive control section 92 instructs actuation of the lens unit in the optical pickup device 34 in such a manner that the tracking error signal and the focus error signal of the optical pickup device come to zero. An actual tilt angle, which is the current tilt angle of the lens unit in the radial direction, is also output from the optical pickup device 34 to the drive control section 92. The drive control section 92 compares the actual tilt angle with the reference tilt angle stored in a storage section 94, which will be described later, and instructs the tilt actuation of the lens unit in such a manner that a difference between the angles comes to zero.

The reference tilt angle acquired through test irradiation, and the like, is stored in the storage section 94. The reference tilt angle is determined from reproduction quality achieved when data are recorded by means of subjecting a recorded area of an optical disk to test exposure, to thus effect test reproduction, while the tilt angle of the lens unit is being changed. Specifically, the tilt angle at which best reproduction quality is achieved is stored as a reference tilt angle. The amount of warpage in the optical disk 32 varies from the inner radius to the outer radius. For this reason, the reference tilt angle is acquired at a plurality of locations corresponding to different radial positions of the optical disk 32. Consequently, the storage section 94 stores, in an associated manner, the plurality of reference tilt angles and the radial positions where the respective reference tilt angles have been acquired. As mentioned above, as a result of advanced acquisition of the reference tilt angles, superior recording/reproduction quality can be acquired regardless of warpage in the optical disk 32.

The reference tilt angles may also be acquired by a technique other than the test exposure of a recorded area. For instance, in the case of an HD-DVD, a reference tilt angle may also be acquired by utilization of a servo calibration mark (SCM) formed in a recording plane. Specifically, an optical disk is subjected to text exposure while the tilt angle of the lens unit is being changed. During the course of tracing of lands, an inner peripheral groove SCM and an outer peripheral groove SCM are read. A tilt angle at which two reproduction output levels become equal to each other may also be stored as a reference tilt angle.

Figure 5:
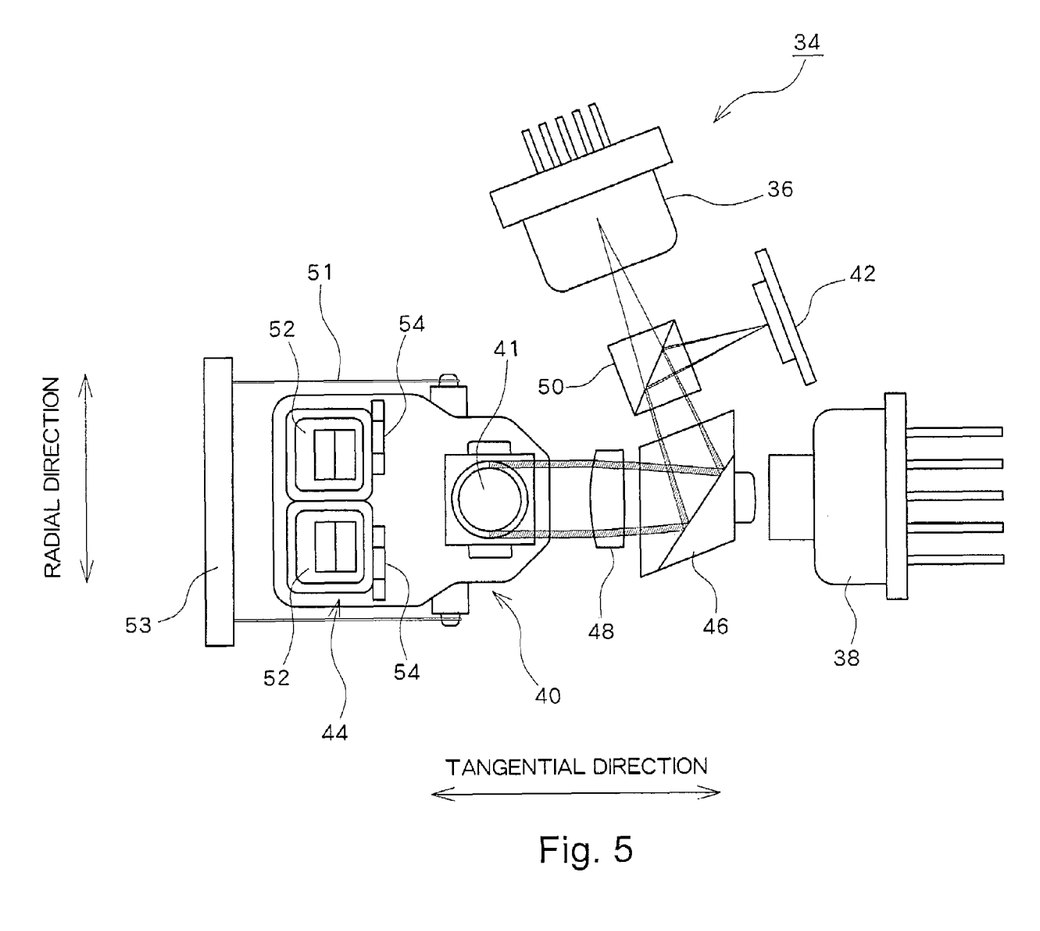
FIG. 5 is a general view of an optical pickup device.
Figure 6:
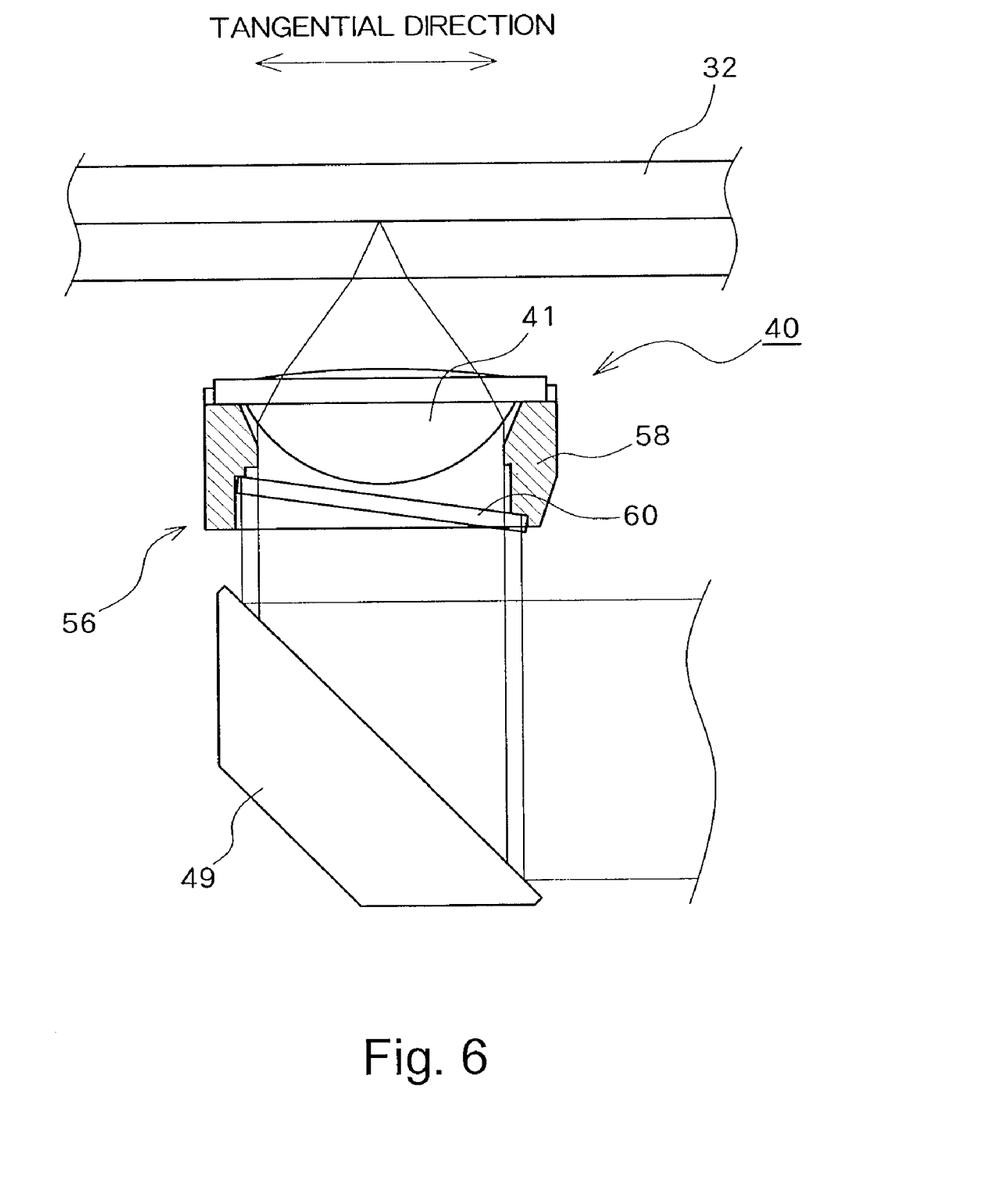
FIG. 6 is a view showing surroundings of a lens unit of the optical pickup device.

The optical pickup device 34 of this optical disk device 30 will now be described in detail. FIG. 5 shows a general diagram of the optical pickup device 34. FIG. 6 shows a side view of surroundings of the lens unit. This optical pickup device 34 is of so-called discrete type, wherein a light source, photodetectors, a polarization beam splitter, and the like are individually, separately arranged.

The optical pickup device 34 has light sources 36, 38 of two types. Outgoing light beams from the respective light sources 36, 38 are guided to an objective lens 41 of a lens unit 40 by means of a plurality of optical devices such as a multiplexing prism 46, and the like. The light beams gathered by the objective lens 41 undergo reflection on the optical disk, and are then received as signal light by photodetectors provided in a light-receiving section 42. Moreover, an actuator consisting of a plurality of electromagnetic coils imparts thrust in a focusing direction, thrust in a tangential direction, and thrust in a radial direction to the lens unit 40 having the objective lens 42, a lens holder 56, and the like, so that the lens unit can be actuated in the horizontal direction and the vertical direction and also be tilted and actuated in the radial direction.

The light source is equipped with a blue laser diode (a blue LD) 36 for emitting a laser beam of blue wavelength band and a dual wavelength laser diode 38 (a dual wavelength LD) for emitting a laser beam of red wavelength band and a laser beam of infrared wavelength band. Each of the laser beams emitted from the light sources 36 and 38 assumes a non-uniform distribution of intensity, such as a Gaussian distribution. Moreover, the laser beams are emitted as diffused light having a given spread.

Optical paths of the laser beams emitted as incident laser beams from the respective light sources 36, 38 are multiplexed by means of the multiplexing prism 46. In the multiplexing prism 46, an optical thin film—which reflects light of blue wavelength band and enables transmission of light of red wavelength band and infrared wavelength band—is deposited on a multiplexing plane of the multiplexing prism. Accordingly, the multiplexing plane is arranged so as to make an angle of 35° with respect to the optical axis of the incident laser beams emitted from the respective light sources 36, 38. The incident laser beams having passed through or having been reflected from the multiplexing prism 46 are collimated into collimator beams by means of a collimator 48. Moreover, the incident laser beams travel upright along an upright mirror 49 to thus proceed toward the objective lens 41.

After having been polarized from linearly-polarized beams into circularly-polarized beams by means of a quarter-wavelength plate 60 provided in a lower portion of the lens holder 56, the incident laser beams having traveled toward the objective lens 41 enter the objective lens 41. The incident laser beams gathered by the objective lens 41 are radiated over the recording plane of the optical disk 32, to thus record or reproduce information. Subsequently, the laser beams are reflected while being modulated in accordance with the presence/absence of data. The thus-reflected laser beams undergo, as signal light, reflection on the upright mirror 49 and the multiplexing prism 46, and travel in opposite directions along an optical path essentially identical with the optical path along which the laser beams have traveled outward. After having undergone reflection on a polarization beam splitter 50 interposed between the blue LD 36 and the multiplexing prism 46, the signal light travels toward the light-receiving section 42. The polarization beam splitter 50 enables reflection or transmission of light in accordance with a polarization characteristic. The reason why the signal light is reflected by the polarization beam splitter 50 is that the signal light has passed through the quarter-wavelength plate 60 once during the course of traveling to the outside and once again during the course traveling to the inside, and has eventually become S-polarized light of a polarization direction which is displaced by 90° from the polarization direction of the incident laser beams, which are P-polarized light.

A plurality of photodetectors for receiving signal light are disposed in the light-receiving section 42. The light intensity of signal light detected by the photodetectors is converted into an electric signal, and the electric signal is output to the signal-processing section 90. Moreover, the light-receiving section 42 is also provided with a detector which receives reflected light for sensing to be described later.

The lens unit 40 is formed from an actuator for actuating the lens unit 40, the objective lens 41, and the lens holder 56 for holding the objective lens 41. The lens unit 40 is supported by a frame 53 via a suspension wire 51 in a cantilever fashion. Horizontal actuation, vertical actuation, and tilt actuation of the lens unit 40 are enabled by means of deforming the suspension wire 53. By means of causing an electric current to flow through an electromagnetic coil provided in an actuator 44, electromagnetic force is generated by electromagnetic interaction with a magnetic circuit (not shown) fixedly disposed in the vicinity of the frame 53, whereupon the suspension wire 51 is deformed.

This actuator 44 has a focusing actuator 52 for imparting vertical thrust to the lens unit 40, and a tracking actuator 54 for imparting thrust in a tracking direction to the lens unit 40. The focusing actuator 52 is formed from two electromagnetic coils disposed side by side in a radial direction thereof. The lens unit 40 can be tilted and actuated by means of applying different voltages to the two electromagnetic coils; in other words, causing the two electromagnetic coils to generate thrust of different magnitudes.

The objective lens 41 is held by the lens holder 56. The lens holder 56 is built up of a holder main body section 58 and the quarter-wavelength plate 60. As mentioned previously, the quarter-wavelength plate 60 polarizes the transmitted Light and is provided in a lower portion of the holder main body section 58 while being inclined in the tangential direction. A wavelength-selective aperture limitation film (not shown) is formed in a bottom plane of the quarter-wavelength plate 60, and acts as an aperture limitation section for limiting beam sizes of the incident laser beams that enter the objective lens 41. The wavelength-selective aperture limitation film is an optical thin film for limiting transmission of light in accordance with a wavelength, and is formed in the bottom plane of the quarter-wavelength plate 60 in such a way that a desired beam size is achieved for a given wavelength.

The reasons why such a wavelength-selective aperture limitation film is provided are as follows. In order to effectively gather the incident laser beams to the optical disk 32, light intensity along the outer rim of the objective lens 41 (i.e., rim intensity) must be of a given level or greater. To this end, an incident laser beam whose beam size is greater than a required beam size is usually emitted, and the beam size of the thus-emitted incident laser beam is limited by means of the wavelength-selective aperture limitation film. Moreover, changing the beam size in accordance with a wavelength is for acquiring an NA appropriate for the wavelength of the emitted laser beam.

Figure 7A:
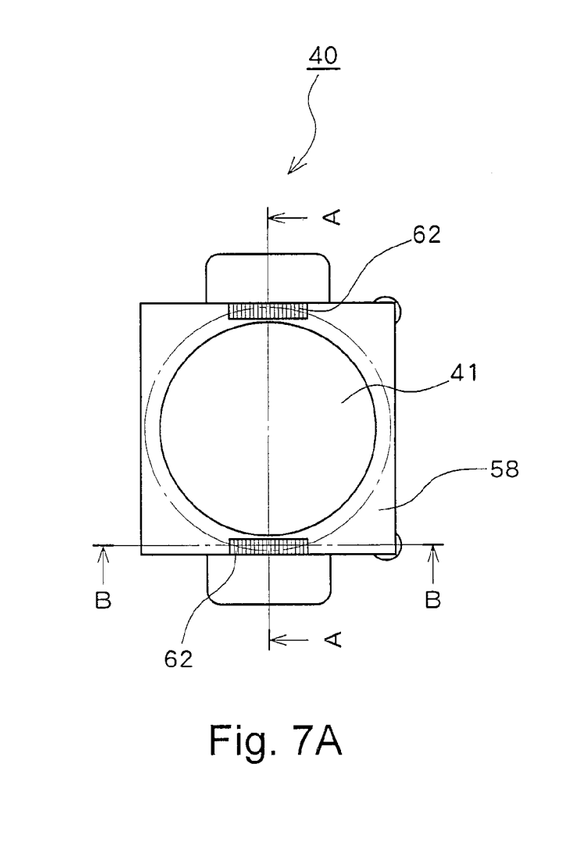
FIG. 7A is a bottom view of the lens unit of the optical pickup device.
Figure 7B:
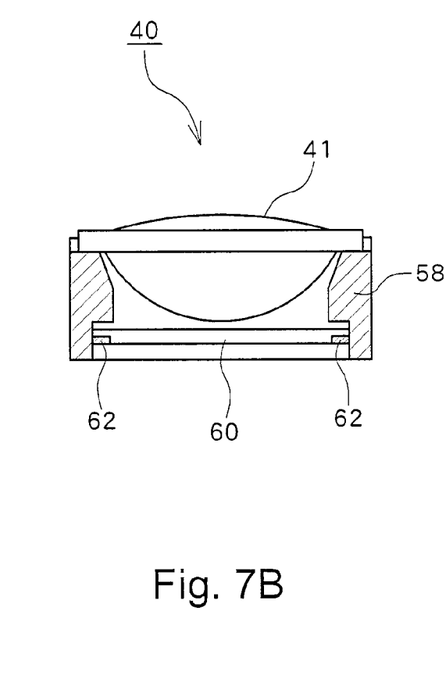
FIG. 7B is a cross-sectional view taken along line A-A shown in FIG. 7A.
Figure 7C:
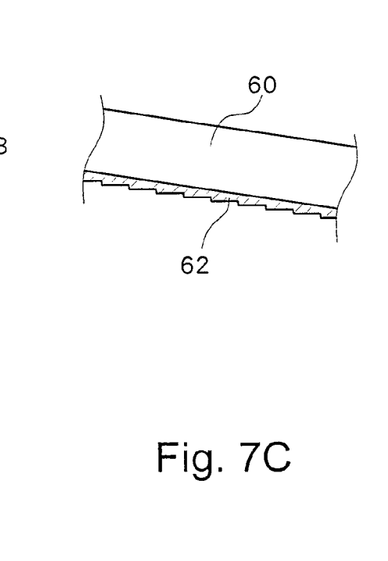
FIG. 7C is a cross-sectional view taken along line B-B shown in FIG. 7A.

In the present embodiment, this aperture limitation film portion is provided with a reflection mirror 62. This reflection mirror 62 is described by reference to FIGS. 7A to 7C. FIG. 7A is a bottom view of the lens unit 40; FIG. 7B is a cross-sectional view taken along line A-A shown in FIG. 7A; and FIG. 7C is a cross-sectional view taken along line B-B shown in FIG. 7A. The reflection mirror 62 is for reflecting a portion of the incident laser beam whose entrance into the objective lens 41 is limited by the wavelength-selective aperture limitation film, and has a multilayer structure consisting of a quarter-wavelength thin film and a reflection film. The quarter-wavelength thin film is an optical thin film (formed from, e.g., a crystalline polymer and the like) which polarizes passed light as does the quarter-wavelength plate. Consequently, the light reflected by the reflection mirror 62 turns into S-polarized light having a phase difference of 90° with respect to the incident laser beam. Thus, the reflected light undergoes reflection on the polarization beam splitter 50 to thus be able to assume essentially the same optical path as that assumed by the signal light.

The reflection mirror 62 is provided in the number of two, and the two are separated from each other in a radial direction. Although the quarter-wavelength plate 60 where the reflection mirror 62 is formed is disposed in an inclined manner, a plurality of horizontal reflection planes are formed stepwise in an area where the reflection mirror 62 is to be formed, as shown in FIG. 7C.

The laser beam reflected by the reflection mirror 62 is received, as reflected light for sensing, by the photodetector provided in the light-receiving section 42 along with the signal light reflected by the optical disk 32. An optical path of reflected light for sensing is hatched in FIG. 5.

Figure 8A:
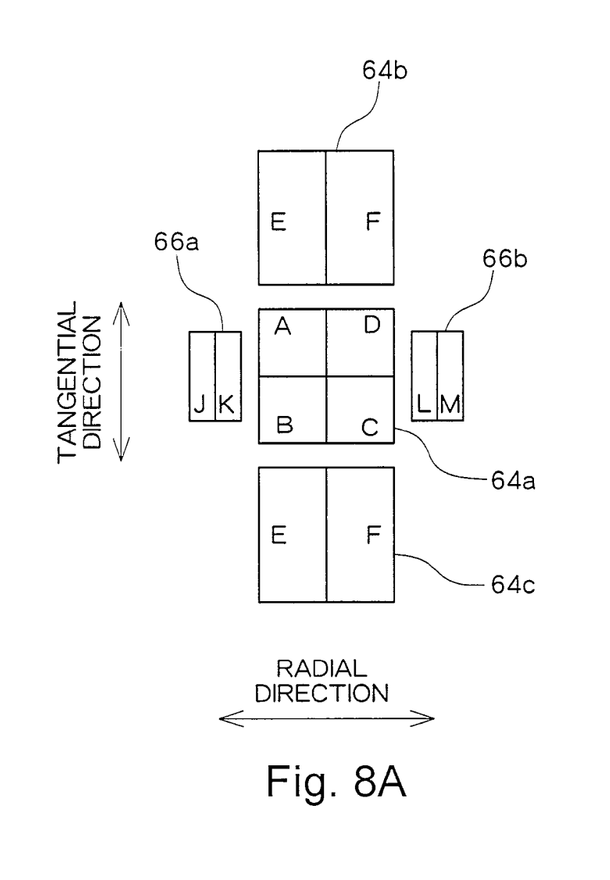
FIG. 8A is a view showing an example arrangement of a photodetector.

FIG. 8A is a view showing an example arrangement of the photodetector in the light-receiving section 42. The photodetector is broadly divided into a signal detector 64 serving as a photodetector for detecting signal light and a detector 66 serving as a photodetector which receives reflected light for sensing.

The signal detector 64 is formed from a four-way-split photodetector 64a for receiving signal light. When data are recorded or reproduced by means of a differential push-pull method, two-way-split photodetectors 64b and 64c are disposed on respective sides of the four-way-split photodetector 64a along the tangential direction thereof.

The detector 66 is formed from two two-way-split photodetectors 66a and 66b which are disposed on respective sides of the signal detector 64 along the radial direction thereof. Each of the two-way-split photodetectors 66a and 66b receives light for sensing reflected by the respective reflection mirror 62. The light intensity levels detected by respective photodetector pieces J, K, L, and M are output to an unillustrated computing section. The computing section computes a tilt angle from the thus-output light intensity levels. The tilt angle is computed by means of the basic principle described by reference to FIGS. 2A to 2C and FIGS. 3A to 3C. In short, the tilt angle is computed by means of Equation (1).

Figure 8B:
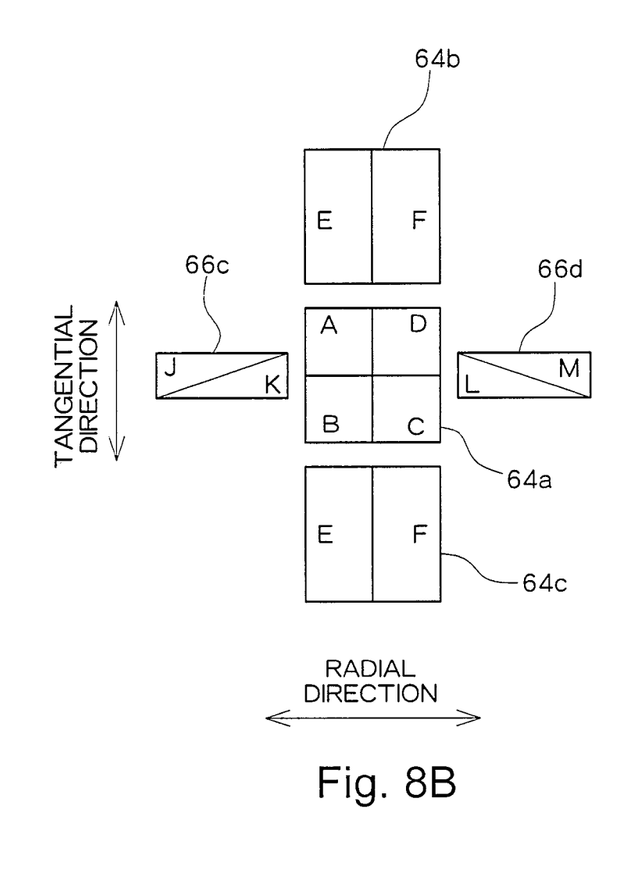
FIG. 8B is a view showing an example arrangement of the photodetector.

Photodetectors 66c and 66d obliquely split as shown in FIG. 8B may also be used as the detector 66. As a result of oblique splitting of the photodetectors, each of the detector pieces can receive light even when the reflected light for sensing has moved much and, by extension, can accurately acquire a tilt angle. Moreover, so long as the photodetector is formed into a shape elongated in a radial direction, a range over which the reflected light for sensing can be received can be broadened, so that a tilt angle can be acquired more accurately.

A tilt angle computed here is determined from the behavior of the light for sensing reflected by the reflection mirror 62. As is evident from the above descriptions, the reflection mirror 62 is actuated in conjunction with the objective lens 41. Consequently, the tilt angle determined from the behavior of the light for sensing reflected by the reflection mirror 62 can be said to accurately reflect the tilt angle of the objective lens 41. Moreover, since variations in light intensity attributable to horizontal actuation are eliminated, an accurate tilt angle can be acquired even when the lens holder 56 is horizontally actuated. Consequently, using the tilt angle computed by the computing section as a reference tilt angle or an actual tilt angle enables superior correction of a tilt. This in turn leads to a further improvement in the quality of recording/reproduction of information.

The reflected light for sensing corresponds to a laser beam which does not enter the objective lens among the recording/reproduction laser beams (incident laser beams). Consequently, there is no necessity for provision of a new light source, or the like, in order to detect a tilt angle, and a tilt angle can be readily acquired. Moreover, since a new member, and the like, is not required, an increase in the size of the optical disk device 30 can also be prevented.

An embodiment where a radial tilt angle of the objective lens is acquired to thus actuate and control the lens holder has been described. However, the position where the reflector is disposed may be offset by 90°, and a tangential tilt angle may also be acquired, to thus effect actuation and control.

Figure 9:
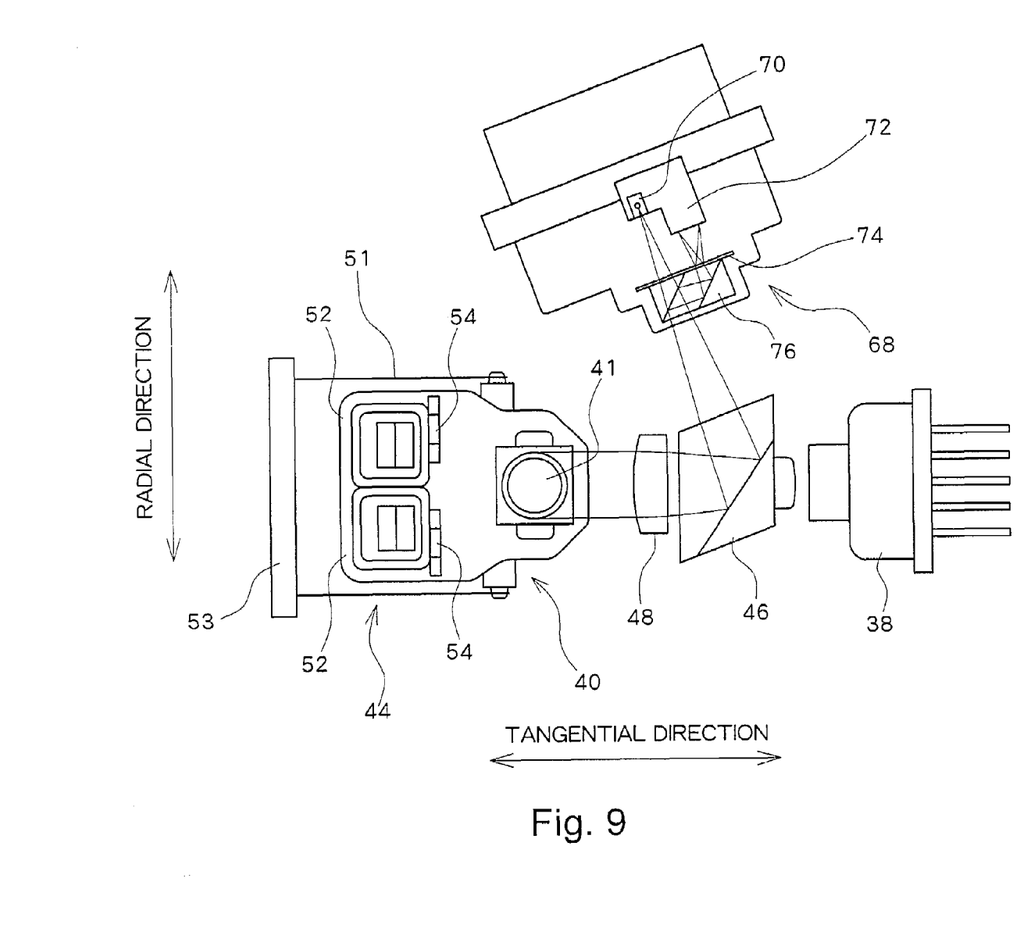
FIG. 9 is a general block diagram of an optical pickup device which is another embodiment of the present invention.

The optical pickup device 34 of hologram type, which is another embodiment of the present invention, will now be described. FIG. 9 shows a general block diagram of the optical pickup device 34 of hologram type. The optical pickup device 34 has a blue hologram unit 68 into which a light source 70 of blue wavelength band, a polarization beam splitter 76, and a photodetector 72 are integrated, but is principally identical with that described in connection with the above embodiment. The blue hologram unit 68 is a unit into which the light source 70 (a blue laser chip emitting a laser beam of blue wavelength band), the polarization beam splitter 76, a hologram 74, and the photodetector 72 are assembled.

Even the optical pickup device of hologram type can detect the tilt angle of the objective lens 41 by means of providing the lens holder 56 with the reflection mirror 62 and further a detection photodetector for receiving light for sensing reflected by the reflection mirror 62.

Even in the case of the optical pickup device of hologram type, an accurate tilt angle can be detected, and quality of recording/reproduction of information can be enhanced to a greater extent. Moreover, use of the hologram unit enables miniaturization of the entire device.

Figure 10:
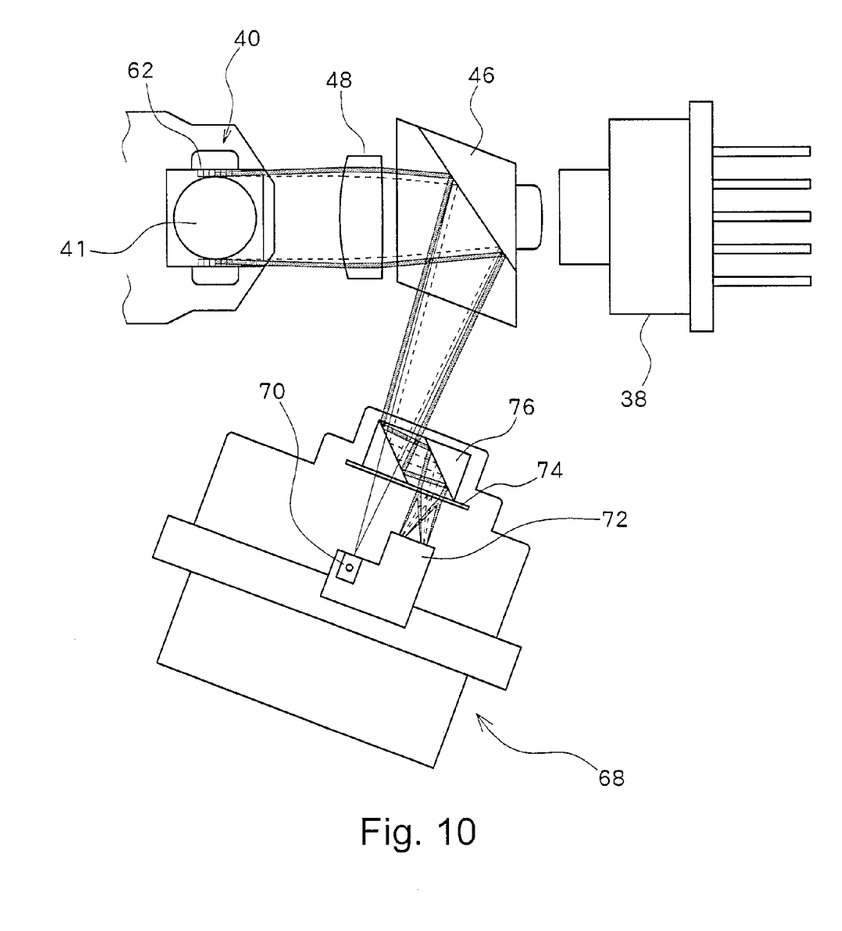
FIG. 10 is a general bottom view of an optical pickup device which is yet another embodiment of the present invention.

Yet another embodiment of the present invention will now be described by reference to FIG. 10. FIG. 10 is a general bottom view of the optical pickup device 34 which is yet another embodiment of the present invention. In FIG. 10, an optical path of reflected light for sensing is hatched, and an optical path of signal light is designated by a broken line. In this optical pickup device 34, the reflection plane of the reflection mirror 62 is tilted outwardly in the radial direction. Accordingly, the optical path of the reflected light for sensing spreads slightly outside of the optical path of signal light. Thus, occurrence of crosstalk between signal light and reflected light for sensing can be prevented by slightly separating the reflected light for sensing from the signal light, so that a more accurate tilt angle can be acquired.

The invention claimed is:

1. An optical pickup device which irradiates an optical disk with a recording/reproduction laser beam from a light source while tilting and horizontally actuating a lens holder which holds an objective lens, to thus record/reproduce information, the device comprising:
    a reflector which is provided in the lens holder and reflects a portion of the recording/reproduction laser beam guided from the light source to the lens holder;
    light detection means fixedly placed at a position where the amount of received reflected light for sensing, which is the recording/reproduction laser beam reflected by the reflector, changes in accordance with a tilt angle of the lens holder; and
    tilt angle acquisition means for acquiring a tilt angle of the objective lens based on the amount of received light detected by the light detection means,
    wherein the tilt angle acquisition means eliminates, from the amount of received light detected by the light detection means, changes in the amount of light received by the light detector attributable to horizontal actuation of the lens holder, to thus acquire a tilt angle.

2. The optical pickup device according to claim 1, wherein the recording/reproduction laser beam assumes a known, uneven distribution of light intensity; and
    the tilt angle acquisition means acquires, based on changes in light intensity of the total reflected light for sensing stemming from horizontal actuation, changes in the amount of light received by the light detector attributable to horizontal actuation of the lens holder.

3. The optical pickup device according to claim 1, wherein the recording/reproduction laser beam is set to a beam size which is greater than an aperture of the objective lens; and
    the reflector is placed at a position where the reflector reflects a recording/reproduction laser beam does not enter the objective lens.

4. The optical pickup device according to claim 3, wherein the lens holder has an aperture limitation section for limiting a beam size of the recording/reproduction laser beam entering the objective lens; and the reflector is provided in the aperture limitation section.

5. The optical pickup device according to claim 1, wherein an optical path of signal light, which is the recording/reproduction laser beam reflected by the optical disk, and an optical path of the reflected light for sensing are oriented in a single direction; and the reflector is disposed at a tilt with respect to incident light to thus slightly separate the reflected light for sensing from the signal light and guide the reflected light to the light detector.

6. The optical pickup device according to claim 5, further comprising:

signal light polarization means for polarizing signal light to a polarization angle differing from that of incident light;

reflected light polarization means for polarizing the reflected light for sensing to the same angle as that of the signal light; and a polarization beam splitter for separating the direction of the optical path of incident light from the direction of the optical path of the signal light and the direction of the optical path of the reflected light for sensing, in accordance with an angle of polarization.

7. The optical pickup device according to claim 1, wherein, when a reflection plane of the reflector tilts with respect to a plane where the reflector is formed, the reflection plane of the reflector is formed stepwise in numbers.

8. An optical disk device which irradiates an optical disk with a recording/reproduction laser beam by use of an optical pickup device to thus record/reproduce information, the optical disk device comprising:

an optical pickup device;

storage means for storing, as a reference tilt angle, a tilt angle of a lens holder acquired when reproduction quality satisfies a predetermined standard during test exposure to an optical disk; and control means for effecting actuation and control, in accordance with a deviation between a reference tilt angle stored in the storage means and a tilt angle of the current lens holder, in such a way that the lens holder assumes the reference tilt angle, wherein the optical pickup device has a reflector which is provided on the lens holder and reflects a portion of the recording/reproduction laser beam guided from a light source to the lens holder;

light detection means fixedly placed at a position where the amount of reflected light for sensing, which is a recording/reproduction laser beam reflected by the reflector, changes in accordance with the tilt angle of the lens holder; and tilt angle acquisition means for acquiring the tilt angle of the objective lens by eliminating, based on the amount of received light detected by the light detection means, changes in the amount of light received by the light detector attributable to horizontal actuation of the lens holder; and the reference tilt angle and the tilt angle of the current lens holder are acquired by the tilt angle acquisition means of the optical pickup device.

* * * * *

UNITED STATES PATENT AND TRADEMARK OFFICE
CERTIFICATE OF CORRECTION

| | | |
|---|---|---|
| PATENT NO. | : 7,701,814 B2 | Page 1 of 1 |
| APPLICATION NO. | : 11/571870 | |
| DATED | : April 20, 2010 | |
| INVENTOR(S) | : Kabasawa et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 552 days.

Signed and Sealed this
Twenty-second Day of March, 2011

David J. Kappos
*Director of the United States Patent and Trademark Office*